(12) United States Patent
Doudement

(10) Patent No.: US 7,448,866 B2
(45) Date of Patent: Nov. 11, 2008

(54) PREFORM HEATING MODULE EQUIPPED WITH AERODYNAMICALLY PROFILED AIR BAFFLE

(75) Inventor: Christophe Doudement, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 131 days.

(21) Appl. No.: 10/582,876

(22) PCT Filed: Nov. 19, 2004

(86) PCT No.: PCT/EP2004/053017
§ 371 (c)(1),
(2), (4) Date: Aug. 14, 2006

(87) PCT Pub. No.: WO2005/068161
PCT Pub. Date: Jul. 28, 2005

(65) Prior Publication Data
US 2007/0085243 A1 Apr. 19, 2007

(30) Foreign Application Priority Data
Dec. 19, 2003 (FR) .................................. 03 51121

(51) Int. Cl.
*F27B 5/14* (2006.01)

(52) U.S. Cl. .................... 432/202; 432/229; 425/174.4; 425/526

(58) Field of Classification Search ................. 432/121, 432/201, 202, 224, 229; 219/388, 405, 411; 425/174.4, 526; 264/454, 458, 520, 521, 264/535
See application file for complete search history.

(56) References Cited

U.S. PATENT DOCUMENTS

| | | | | |
|---|---|---|---|---|
| 3,882,213 A | * | 5/1975 | Uhlig | 264/535 |
| 4,076,071 A | * | 2/1978 | Rosenkranz et al. | 165/263 |
| 4,606,723 A | * | 8/1986 | Pasternicki | 432/124 |
| RE34,177 E | * | 2/1993 | Coxhead et al. | 432/5 |
| 5,322,651 A | | 6/1994 | Emmer | |
| 5,714,109 A | * | 2/1998 | Diller | 264/454 |
| 5,980,229 A | | 11/1999 | Collombin | |
| 6,109,907 A | * | 8/2000 | Takada et al. | 425/526 |
| 6,361,301 B1 | * | 3/2002 | Scaglotti et al. | 425/174.4 |
| 6,632,087 B1 | | 10/2003 | Armellin et al. | |

* cited by examiner

*Primary Examiner*—Gregory A Wilson
(74) *Attorney, Agent, or Firm*—Young & Thompson

(57) ABSTRACT

A module for heating a plastic container perform, includes a longitudinal heating tunnel bounded transversely by the longitudinal vertical internal faces of two walls, one a heating wall, being equipped with a heating system, and the other wall having aeration orifices that are intended to let the air blown by a blower pass through them transversely from the upstream, and in which module a first portion of the preform is heated in the heating tunnel, while a second portion of the preform is held outside the heating tunnel through a longitudinal opening. The blower includes a deflector that deflects a portion of the air blown towards the second portion of the preform so as to prevent it from being heated up to its softening point, characterized in that the upstream end of the deflector is aerodynamically profiled.

12 Claims, 2 Drawing Sheets

PREFORM HEATING MODULE EQUIPPED WITH AERODYNAMICALLY PROFILED AIR BAFFLE

The invention relates to an improved module for heating preforms, especially plastic container preforms, and to a preform heating oven comprising at least one such module.

The invention relates more particularly to a module for heating a preform, especially a plastic container preform, which comprises a longitudinal heating tunnel bounded transversely by the mutually parallel longitudinal vertical internal faces of two walls, one a heating wall, being equipped with a heating system, and the other an aerated wall, having aeration orifices that are intended to let the air blown by at least one blower pass through them transversely from the upstream, outside the heating tunnel, to the downstream, inside the latter, and in which module a first portion of the preform is heated in the heating tunnel, while the second portion of the preform is held outside the heating tunnel through a longitudinal opening made between the longitudinal edges of the walls of the heating tunnel, of the type in which the blower includes a longitudinal deflector that deflects a portion of the air blown transversely towards the second portion of the preform so as to prevent the constituent material of said lower portion of the preform from being heated up to its softening point.

Plastic containers, and especially bottles, for example made of polyethylene terephthalate (PET), are generally produced from preforms injection-moulded beforehand that are shaped into bottles by an operation of blow moulding or stretch-blow moulding of their body and their end wall. The preforms generally have the form of a test tube, the neck of which already has the final shape of the throat of the bottle. The neck has for example a thread intended to receive a screw stopper.

Before carrying out the blow moulding operation, it is necessary to reheat a first portion of the preforms comprising the body and the end wall to a temperature above its glass transition temperature in a heating oven so as to soften the constituent plastic of the preforms.

For this purpose preform heating ovens of the type having a longitudinal heating tunnel are already known. The cold preform is transported by a transport device from a first end of the tunnel and then travels along the tunnel, in which the first portion of the preform comprising the body and the end wall is heated, before emerging via the second end of the tunnel. The preform thus heated is ready for the blow moulding operation.

The heating oven may include one or more heating modules or units, each comprising a tunnel portion and being aligned one after the other so as to form a single tunnel of great length. In the rest of the description, the term "heating module" will be likened to the term "oven".

To ensure depthwise heating of the end wall and the cylindrical wall of the body of the preform over its entire periphery, the preforms are generally rotated about themselves as they travel through the oven. Moreover, one wall of the tunnel is equipped with radiation heating means, while the other wall is provided with aeration orifices for blown air to flow through so as to promote uniform heating throughout the thickness of the cylindrical wall of the body of the preform without overheating the layer of surface material forming the external face of the cylindrical wall of the preform. The blown air removes the convective heat caused by the heating means, in order to promote penetration of the radiation that it produces in the thickness of the constituent material of the body.

However, the second portion of the preform comprising the neck, which has its final shape and its final dimensions during the manufacture, generally by injection moulding of the preform, must not be deformed during the heating and/or blow moulding operations. It is therefore essential to keep this second portion at a temperature below the glass transition temperature or softening point. For this purpose, the neck of the preform is held outside the tunnel through an opening in the tunnel that forms a longitudinal slot.

To prevent the heat from the heating tunnel from being communicated to this second portion of the preform, said second portion is cooled by air blown by a blower.

Preferably, in many installations, the preforms are placed with neck down during at least one part of their heating. This makes it possible to prevent, or limit, the heating of the neck by ascending convective movements of hot air.

It is known to equip the heating modules with a single blower, which makes it possible, on the one hand, for blown air to pass into the heating tunnel and, on the other hand, for the neck of the preform to be cooled. The blower is then equipped with a deflector, which is located upstream of the tunnel and of the preform relative to the flow direction of the air. The deflector thus deflects a portion of the stream of blown air onto the neck of the preform.

The aim of the present invention is to improve the effectiveness with which the neck of the preform is cooled during the heating operation. For this purpose, the invention proposes a heating module of the type described above, characterized in that the upstream end of the deflector is aerodynamically profiled.

According to other features of the invention:
- the deflector is profiled so that the upstream end has a point directed upstream, the thickness of the deflector increasing towards the downstream;
- the downstream end of the deflector is aerodynamically profiled;
- the deflector is profiled so that its thickness progressively decreases as far as its downstream end, which forms a point directed downstream;
- the deflector is a heat shield that prevents heat produced by the heating system from communicating with the second portion of the preform through the opening in the heating tunnel;
- the deflector includes an air-conditioning system;
- the downstream end of the deflector is mounted so as to pivot about a longitudinal axis so as to regulate the flow of air blown to the aerated wall;
- the opening is made between the lower longitudinal edges of the walls of the heating tunnel and in that the blower includes a lower air outlet flap which is placed beneath the deflector and the upstream end of which is mounted so as to pivot about a longitudinal axis so as to guide the air right to the second portion of the preform, below the longitudinal opening made between the lower longitudinal edges of the walls of the heating tunnel; and
- the opening is made between the upper longitudinal edges of the walls of the heating tunnel and in that the blower includes an upper air outlet flap which is placed above the deflector and the upstream end of which is mounted so as to pivot about a longitudinal axis so as to guide the air right to the second portion of the preform, above the longitudinal opening made between the upper longitudinal edges of the walls of the heating tunnel.

The invention also relates to an oven for heating a preform, which includes a plurality of heating modules that are aligned so as to form a tunnel.

Other features and advantages of the invention will become apparent on reading the following detailed description, for the understanding of which the reader should refer to the appended drawings, in which.

Figure 2:
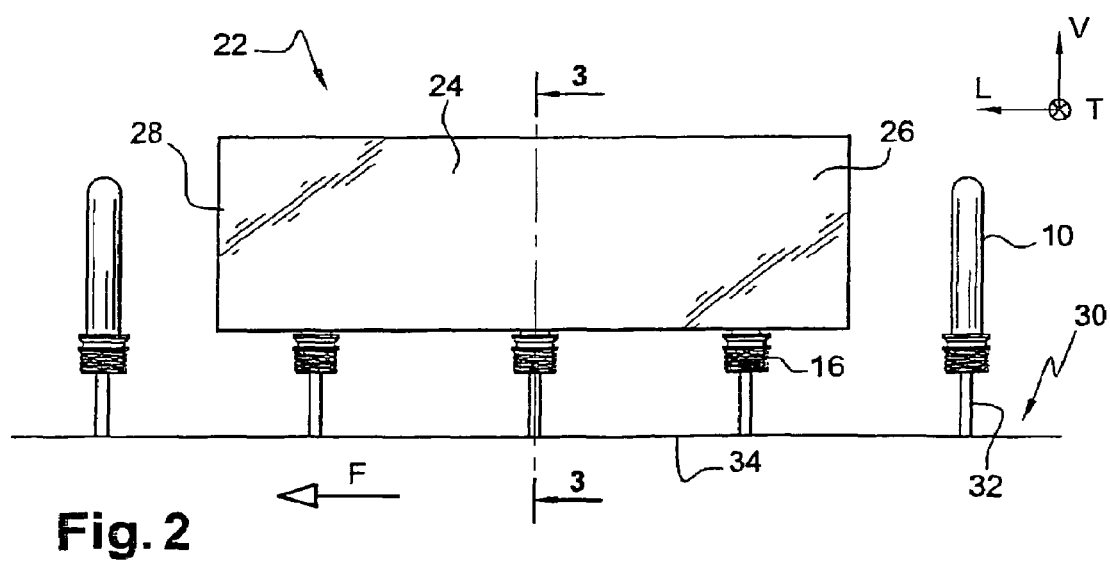
FIG. 2 is a side view showing an oven for heating the preform of FIG. 1, which oven is produced according to the teachings of the invention and allows preforms with their necks down to be heated.

In the rest of the description, a longitudinal, vertical and transverse orientation, indicated by the (L,V,T) coordinate system shown in FIG. 2, will be adopted, but without being limited thereby.

In the rest of the description, an upstream-to-downstream orientation will be used to describe the flow of the streams of fluids.

Figure 1:
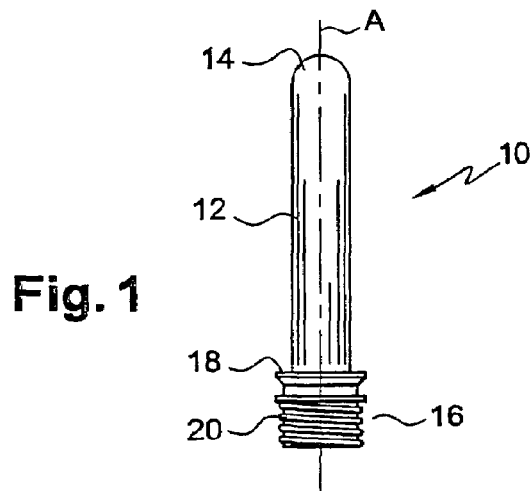
FIG. 1 is a side view showing a preform intended to be heated in an oven before being converted into a bottle after a blow moulding operation.

FIG. 1 shows a preform 10 made of a plastic, such as polyethylene terephthalate (PET), which is intended to be converted into a container, such as a bottle, after a first operation, in which it is heated to soften the plastic, and then a second, blow moulding or stretch-blow moulding, operation in order to shape the preform 10 into a container.

As is known the preform 10 has a test tube shape of vertical axis A. As shown in FIG. 1, the tubular body 12 of the preform 10 is closed at its upper end by a hemispherical end wall 14, while its lower end includes a neck 16 that forms the throat of the finished container.

Since the neck 16 already has the final shape of the throat of the finished container, only the tubular body 12 and its end wall 14 have to be deformed by blow moulding in order to obtain a finished container. During the heating operation, it is therefore important to heat only the tubular body 12 and the end wall 14 of the preform 10, above the glass transition temperature of the constituent material, while keeping the temperature of the neck 16 below the glass transition temperature.

The join between the tubular body 12 and the neck 16 is bounded by a flange 18. The external cylindrical face 20 of the neck here has a screw thread that is intended to receive a threaded stopper (not shown) so as to seal the bottle.

FIG. 2 shows an oven 22 for heating preforms 10 during the heating operation. The oven 22 comprises here a longitudinal heating tunnel 24 through which the preforms 10 are intended to move along the direction indicated by the arrow F. The tunnel 24 has a first end 26 where the preforms 10 enter, on the right in FIG. 2, and a second end 28 where the preforms 10 leave, on the left in FIG. 2.

As illustrated in FIG. 2, the oven 22 includes a device 30 for transporting the preforms 10 from the inlet 26 to the outlet 28 of the tunnel 24. The transport device 30 comprises a train of mandrels 32 for gripping the preforms 10. The mandrels 32 are placed vertically above a lower rail 34 which runs beneath the tunnel 24 so as to be parallel therewith. The mandrels 32 are intended to keep the preforms 10 vertical during their travel along the tunnel 24.

Each mandrel 32 extends vertically in a known manner and includes means for forcibly holding the preforms in place (these not being shown), such as spring washers, which means can be firmly clamped via the internal cylindrical face of the neck 16 when the mandrel 32 is introduced into the neck 16.

The rectilinear longitudinal shape of the tunnel 24 as shown in FIG. 2 is given by way of non-limiting example. The invention is of course applicable to ovens of the circular type, or else of the "caterpillar track" type, which ovens comprise a part in which the preforms 10 are heated neck up, and another part in which the preforms are heated neck down. The latter types of ovens equip certain machines of the Applicant.

Figure 3:
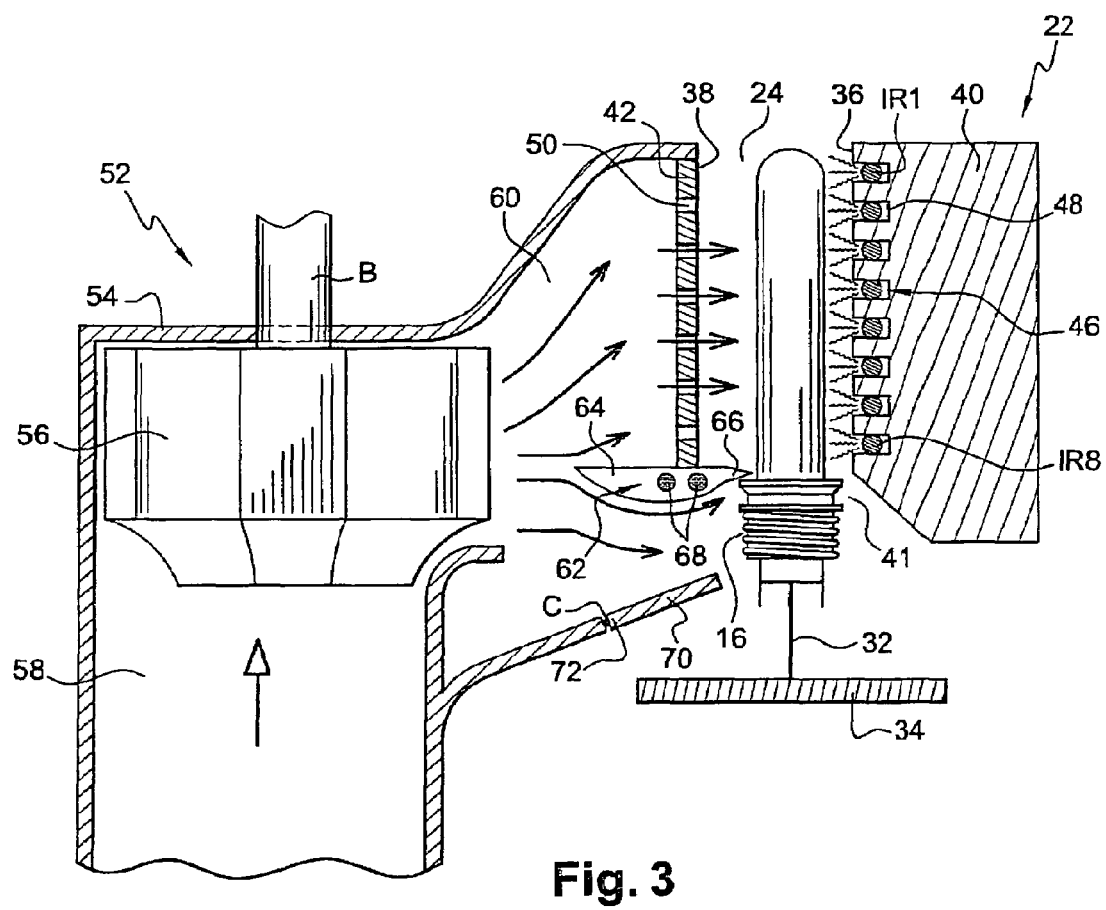
FIG. 3 is a cross-sectional view in the plane 3-3 of FIG. 2, showing the oven equipped with a blower and with a deflector for directing the blown air.

FIG. 3 shows a section of the tunnel 24. It is bounded transversely by two mutually parallel vertical longitudinal internal faces 36 and 38 belonging to a first wall 40, located on the right in FIG. 3, and to a second wall 42, located on the left, respectively.

The tunnel 24 here is closed neither at the top nor at the bottom. Thus, the lower longitudinal edges of the internal faces 36 and 38 bound a lower opening 41 in the form of a longitudinal slot.

The first wall 40 is equipped with a heater 46 for heating the tunnel 24. In the example shown in FIG. 3, the heater 46 comprises eight infrared lamps, which here are referenced IR1 to IR8 and have the form of longitudinal tubes placed horizontally one above the other. The lamps are held by each of their ends close to the internal face 36 of the first wall 40 using means, here vertically distributed longitudinal channels 48, each intended to house one end of the lamps IR1 to IR8.

The second wall 42 here includes orifices 50 that pass transversely through its thickness so as to allow a stream of air to penetrate into the tunnel 24. As explained in the preamble, the stream of air thus enables the convective heat caused by the heater 46 to be removed from the tunnel 24 in order to promote penetration of the radiation into the thickness of the material constituting the body of the cylindrical wall of the preform 10.

For this purpose, the oven 22 is provided with a blower 52 that includes a centrifugal-type fan 54 that is placed outside the tunnel 24, to the left of the second wall 42 in FIG. 3.

The fan 54 includes a bladed wheel 56 which is mounted so as to rotate about a vertical axis B, for example by a motor (not shown). The fan 54 is fed with air via an inlet duct 58 of vertical axis that extends beneath the fan 54. The wheel 56 of the fan 54 delivers a stream of air radially into a transverse downstream outlet or delivery duct 60 as far as the second wall 42.

As shown in FIG. 3, the tubular body 12 and the end wall 14 of the preform 10 are held inside the heating tunnel 24, while the neck 16 and the flange 18 are held outside, just below the lower opening 41 of the tunnel 24.

According to a known variant, the preform 10 is oriented with the neck 16 up and the longitudinal opening 41 is bounded by the upper longitudinal edges of the walls 36 and 38 of the tunnel 24. The neck 16 of the preform 10 is then held in place above the tunnel 24 across the upper opening.

To keep the neck 16 at a temperature below its glass transition temperature, a stream of fresh air is blown transversely towards the neck 16 and the flange 18. The stream of air is produced by the single blower 52, which supplies the tunnel 24 with air. The air outlet duct 60 of the blower 52 therefore includes a deflector 62 that is intended to deflect, towards the neck 16, a portion of the air stream initially blown towards the second wall 42.

The deflector 62 forms a generally longitudinal ramp, the cross section of which is horizontal. It is placed perpendicularly beneath the longitudinal lower edge of the internal face 38 of the second wall 42. Thus, an upstream portion 64 of the deflector 62 extends transversely into the outlet duct 60 of the blower 52 so as to divide the outflowing stream of air into two. However, the upstream portion 64 of the deflector 62 does not divide the outlet duct 60 into two compartments over its entire length, but only over a downstream portion of the duct 60.

A downstream portion 66 of the deflector 62 extends transversely beneath the lower opening 41 of the tunnel 24 as far as the neck 16 of the preform 10. The downstream end of the deflector 62 is thus flush with the neck 16, just above the flange 18.

Advantageously, the deflector 62 also forms a shield that prevents infrared radiation emitted by the lamps IR1 to IR8 from reaching the neck 16.

According to the teachings of the invention, the cross section of the upstream portion 64 of the deflector 62 is aerodynamically profiled so that the stream of air that is deflected by the deflector 62, towards the neck 16 and the flange 18, undergoes laminar flow. In the embodiment shown in FIG. 3, the central portion of the deflector 62 has a thickness that becomes narrower until forming an upstream point.

Advantageously, the cross section of the downstream portion 66 of the deflector 62 is also aerodynamically profiled so that the flow of air is laminar and if possible accelerated towards the neck 16 and the flange 18. The cross section of the deflector 62 is thus similar to that of an aircraft wing or to the lower half of a drop of water, the tip of which is directed transversely towards the neck 16 and the flange 18 of the preform 10.

Advantageously, the deflector 62 also forms a heat shield that prevents propagation of the heat, via conduction or radiation, from the inside of the tunnel 24 as far as the neck 16 and the flange 18. The deflector 62 is thus cooled by an air-conditioning system that consists here of two longitudinal ducts 68 formed in the thickness of the deflector 62. A heat-transfer fluid, for example water, circulates in the ducts 68 so as to remove the heat received by the upper face of the reflector 62.

The outlet duct 60 includes a lower flap 70 which forms a lower wall of the outlet duct 60. An upstream end 72 of the lower flange 70 is mounted so as to pivot about a longitudinal axis C. The flap 70 can thus be oriented so as to direct the air stream output by the fan 54 towards the neck 16 and the flange 18, irrespective of the dimensions of the neck 16 and the flange 18. This is an advantage, which thus makes it possible to optimise the geometry of the outlet duct 60 in order for the neck 16 and the flange 18 of preforms 10 of various dimensions to be optimally cooled.

In a variant (not shown) of the invention, the downstream portion 66 of the deflector 62 is mounted so as to pivot about a longitudinal axis so that the quantity of air deflected towards the neck 16 and towards the flange 18 can be controlled according to the angular orientation of the deflector 62.

During operation of the oven 22, the preform 10 held in place by the mandrel 32 is introduced into the tunnel 24 via the inlet end 26. It is made to move translationally towards the outlet end 28 of tunnel 24 and simultaneously rotated about its vertical axis A so that the entire periphery of the preform 10 is heated by the lamps 1R1 to IR8 placed on the heating wall 36. The neck 16 and the flange 18 of the preform 10 are located beneath the deflector 62.

The fan 54 of the blower 52 blows a stream of air into the outlet duct 60 towards the second wall 42. One portion of the stream of air is deflected by the deflector 62, undergoing laminar flow, towards the neck 16 and the flange 18.

Thus, the fact of deflecting the air towards the neck 16 and the flange 18 so as to undergo a laminar flow makes it possible to maintain a rapid and effective stream of air for expelling the hot air that descends from the upper tunnel through the lower opening 41 of the oven 22. The cooling of the neck 16 and the flange 18 is therefore improved thanks to the deflector 62 according to the invention.

According to another advantage of the invention, the presence of the deflector 62, the upstream end 64 of which is aerodynamically profiled, considerably improves the effectiveness with which the neck 16 of the preform 10 is cooled during the heating operation, whether the preform 10 is oriented with the neck 16 lowermost, as shown in the figures, or with the neck 16 uppermost.

In a variant (not shown) of the invention, in the case of an oven intended to heat preforms 10 placed neck 16 up, the vertical orientation V in FIGS. 2 and 3 is the opposite of that shown. Thus, the deflector 62 is then placed beneath the neck 16 and the flange 18, while the mandrels 32 are placed vertically beneath the rail 34, which then extends above the tunnel 24. The opening 41 is then an upper opening of the tunnel 24.

In a variant (not shown), the oven may include, in a known manner, a plurality of modules each comprising a tunnel portion, a heating device and a blower, as described above. These modules are aligned one after another so as to form a single heating tunnel 24 composed of tunnel portions of each of the modules. In this configuration, the oven includes a single transport device 30. The deflector 62 may be formed from several deflector portions or from a single component with dimensions corresponding to the total length of the tunnel 24.

The invention claimed is:

1. Module (22) for heating a preform (10), especially a plastic container preform, which comprises a longitudinal heating tunnel (24) bounded transversely by the mutually parallel longitudinal vertical internal faces (36, 38) of two walls (40, 42), one a heating wall (40), being equipped with a heating system (46), and the other an aerated wall (42), having aeration orifices (50) that are intended to let the air blown by at least one blower (52) pass through them transversely from the upstream, outside the heating tunnel (24), to the downstream, inside the latter, and in which module a first portion (12, 14) of the preform (10) is heated in the heating tunnel (24), while a second portion (16) of the preform (10) is held outside the heating tunnel (24) through a longitudinal opening (41) made between the longitudinal edges of the walls (36, 38) of the heating tunnel (24), of the type in which the blower (52) includes a longitudinal deflector (62) that deflects a portion of the air blown transversely towards the second portion (16) of the preform (10) so as to prevent the constituent material of said lower portion (16) from being heated up to its softening point, characterized in that the upstream end (64) of the deflector (62) is aerodynamically profiled, and characterized in that the opening (41) is made between the lower longitudinal edges of the walls (36, 38) of the heating tunnel(24) and in that the blower (52) includes a lower air outletflap (70) which is placed beneath the deflector (62) and the upstream end (72) of which is mounted so as to pivot about a longitudinal axis (C) so as to guide the air right to the second portion (16) of the preform (10), below the longitudinal opening (41) made between the lower longitudinal edges of the walls (36, 38) of the heating tunnel (24).

2. Module (22) for heating a preform (10), especially a plastic container preform, which comprises a longitudinal heating tunnel (24) bounded transversely by the mutually parallel longitudinal vertical internal faces (36, 38) of two walls (40, 42), one a heating wall (40), being equipped with a heating system (46), and the other an aerated wall (42), having aeration orifices (50) that are intended to let the air blown by at least one blower (52) pass through them transversely from the upstream, outside the heating tunnel (24), to the downstream, inside the latter, and in which module a first portion (12, 14) of the preform (10) is heated in the heating tunnel (24), while a second portion (16) of the preform (10) is held outside the heating tunnel (24) through a longitudinal opening (41) made between the longitudinal edges of the walls (36, 38) of the heating tunnel (24), of the type in which the blower (52) includes a longitudinal deflector (62) that deflects a portion of the air blown transversely towards the second portion (16) of the preform (10) so as to prevent the constituent material of said lower portion (16) from being heated up to its softening point, characterized in that the up stream end (64) of the deflector (62) is aerodynamically profiled, and characterized in that the opening (41) is made between the upper longitudinal edges of the walls (36, 38) of the heating tunnel (24) and in that the blower (52) includes an upper air outlet flap (70) which is placed above the deflector (62) and the upstream end (72) of which is mounted so as to pivot about a longitudinal axis (C) so as to guide the air right to the second portion (16) of the preform (10), above the longitudinal opening (41) made between the upper longitudinal edges of the walls (36, 38) of the heating tunnel (24).

3. Module (22) for heating a preform (10), especially a plastic container preform, which comprises a longitudinal heating tunnel (24) bounded transversely by the mutually parallel longitudinal vertical internal faces (36, 38) of two walls (40, 42), one a heating wall (40), being equipped with a heating system (46), and the other an aerated wall (42), having aeration orifices (50) that are intended to let the air blown by at least one blower (52) pass through them transversely from the upstream, outside the heating tunnel (24), to the downstream, inside the latter, and in which module a first portion (12, 14) of the preform (10) is heated in the heating tunnel (24), while a second portion (16) of the preform (10) is held outside the heating tunnel (24) through a longitudinal opening (41) made between the longitudinal edges of the walls (36, 38) of the heating tunnel (24), of the type in which the blower (52) includes a longitudinal deflector (62) that deflects a portion of the air blown transversely towards the second portion (16) of the preform (10) so as to prevent the constituent material of said lower portion (16) from being heated up to its softening point, characterized in that the deflector (62) is profiled so that the upstream end (64) has a point directed upstream, the thickness of the deflector (62) increasing towards the downstream until the central portion and its thickness progressively decreases as far as its downstream end (66) which forms a point directed downstream, so that the stream of air that is deflected by the aerodynamically profiled deflector (62) undergoes laminar flow towards the second portion (16).

4. Module (22) according to claim 3, characterized in that the upstream end (64) of the deflector (62) is aerodynamically profiled so that the stream of air that is deflected by the deflector (62), towards the second portion (16), undergoes laminar flow.

5. Module (22) according to claim 3, characterized in that the downstream end (66) of the deflector (62) is aerodynamically profiled so that the flow of air is laminar and accelerated towards the second portion (16).

6. Module (22) according to claim 3, characterized in that the deflector (62) is placed perpendicularly beneath the longitudinal lower edge of the internal face (38) of the second wall (42) so that the upstream portion (64) of the deflector (62) extends transversely into a outlet duct (60) of the blower (52) so as to divide the outflowing stream of air into two and the downstream portion (66) of the deflector (62) extends transversely beneath the lower opening (41) of the tunnel (24) as far as the second part (16) of the preform (10).

7. Module (22) according to claim 3, characterized in that the deflector (62) is a heat shield that prevents heat produced by the heating system (46) from communicating with the second portion (16) of the preform (10) through the opening (41) in the heating tunnel (24).

8. Module (22) according to claim 3, characterized in that the deflector (62) includes an air conditioning system (68).

9. Module (22) according to claim 3, characterized in that the downstream end (64) of the deflector (62) is mounted so as to pivot about a longitudinal axis so as to regulate the flow of air blown towards the aerated wall (42).

10. Module (22) according to claim 3, characterized in that the opening (41) is made between the lower longitudinal edges of the walls (36, 38) of the heating tunnel (24) and in that the blower (52) includes a lower air outlet flap (70) which is placed beneath the deflector (62) and the upstream end (72) of which is mounted so as to pivot about a longitudinal axis (C) so as to guide the air right to the second portion (16) of the preform (10), below the longitudinal opening (41) made between the lower longitudinal edges of the walls (36, 38) of the heating tunnel (24).

11. Module (22) according to claim 3, characterized in that the opening (41) is made between the upper longitudinal edges of the walls (36, 38) of the heating tunnel (24) and in that the blower (52) includes an upper air outlet flap (70) which is placed above the deflector (62) and the upstream end (72) of which is mounted so as to pivot about a longitudinal axis (C) so as to guide the air right to the second portion (16) of the preform (10), above the longitudinal opening (41) made between the upper longitudinal edges of the walls (36, 38) of the heating tunnel (24).

12. Oven for heating a preform (10), which includes a plurality of heating modules (22) according to claim 3 that are aligned so as to form a tunnel (24).

* * * * *